Nov. 11, 1969 HANS-OTTO G. LEILICH ET AL 3,478,335

CHAIN MAGNETIC MEMORY ELEMENT

Filed June 23, 1964

UNORIENTED CHAIN STORAGE ELEMENT

ORIENTED CHAIN STORAGE ELEMENT

INVENTORS
HANS-OTTO G. LEILICH
ARNOLD F. SCHMECKENBECHER

BY David M. Koffsky
ATTORNEY

United States Patent Office 3,478,335
Patented Nov. 11, 1969

3,478,335

CHAIN MAGNETIC MEMORY ELEMENT

Hans-Otto G. Leilich and Arnold F. Schmeckenbecher, Poughkeepsie, N.Y., assignors to International Business Machines Corporation, New York, N.Y., a corporation of New York Filed June 23, 1964, Ser. No. 377,308
Int. Cl. G11b *5/00*
U.S. Cl. 340—174 4 Claims

ABSTRACT OF THE DISCLOSURE

An elongated chain store element having an apertured link which the link is magnetically oriented longitudinally around everywhere around apertures thereof. The longitudinal orientation is provided by a magnetic field parallel to the chain during deposition of magnetic material on the element.

This invention relates to magnetic memories, and more particularly to an improved memory element for a magnetic memory.

Modern data processing systems are placing increasingly stringent speed requirements on their memory capabilities. These enhanced speeds must be met but in such a manner as to produce a memory whose cost is competitive with its predecessors. To cope with these conflicting requirements, memory designers have invented numerous new memory configurations and devices. Among these have been the thin film magnetic memory, various ferrite arrays, miniaturized magnetic core configurations, and other batch-produced magnetic strip memory devices. A magnetic strip memory device which has proven extremely useful in meeting the increased requirements is described in its various configurations in the following patent applications:

(a) Application of J. C. Sagnis, Jr., M. Teig and R. L. Ward, "Nondestructive Readout Magnet Memory," Ser. No. 224,415, filed Sept. 18, 1962;

(b) Application of J. C. Sagnis, Jr. and P. E. Stuckert, "Magnetic Strip Memory," Ser. No. 255,479, filed Feb. 1, 1963;

(c) Application of J. L. Anderson, H. O. Leilich and D. H. Redfield, "Magnetic Memory," Ser. No. 332,746, filed Dec. 23, 1963, now Patent No. 3,371,327;

(d) Application of A. F. Schmeckenbecher, "Chemical Plating Solution Process and Product," Ser. No. 353,849, filed Mar. 23, 1964; and (e) Application of H. O. Leilich, "Magnetic Memory Apparatus," Ser. No. 332,588, filed Dec. 23, 1963, now Patent No. 3,378,821.

Copending patent applications (a) and (b) disclose a magnetic strip memory element in the form of a solid strip of conductive magnetic material of apertured configuration which is operable in the orthogonal mode. Because of the chain-like configuration of this type of memory device, it has come to be called "the chain store" and the magnetic strip to be called "the chain." Copending patent application (c) discloses a chain configuration wherein the chain storage element comprises an apertured conductor which has been coated with a thin magnetic film. Copending application (d) describes an electroless chemical reduction process, solution and composition for producing a thin magnetic film coating on a chain storage element. Copending patent application (e) discloses the operation of the chain storage element with unipolar drive pulses.

It is a principal object of this invention to provide an improved chain storage element.

Another object of this invention is to improve the disturb sensitivity and output signal characteristics of the chain storage element.

Still another object of this invention is to provide an improved chain storage element which is economically producible.

In accordance with the above-stated objects, an apertured conductive strip is provided with a thin anisotropic magnetic coating. The magnetic coating exhibits an easy direction of magnetization parallel to the length dimension of the apertured conductive strip and a hard direction of magnetization which is parallel to the width dimension of the apertured strip.

The foregoing and other objects, features and advantages of the invention will be apparent from the following more particular description of preferred embodiments of the invention, as illustrated in the accompanying drawings.

Figures 1, 2:
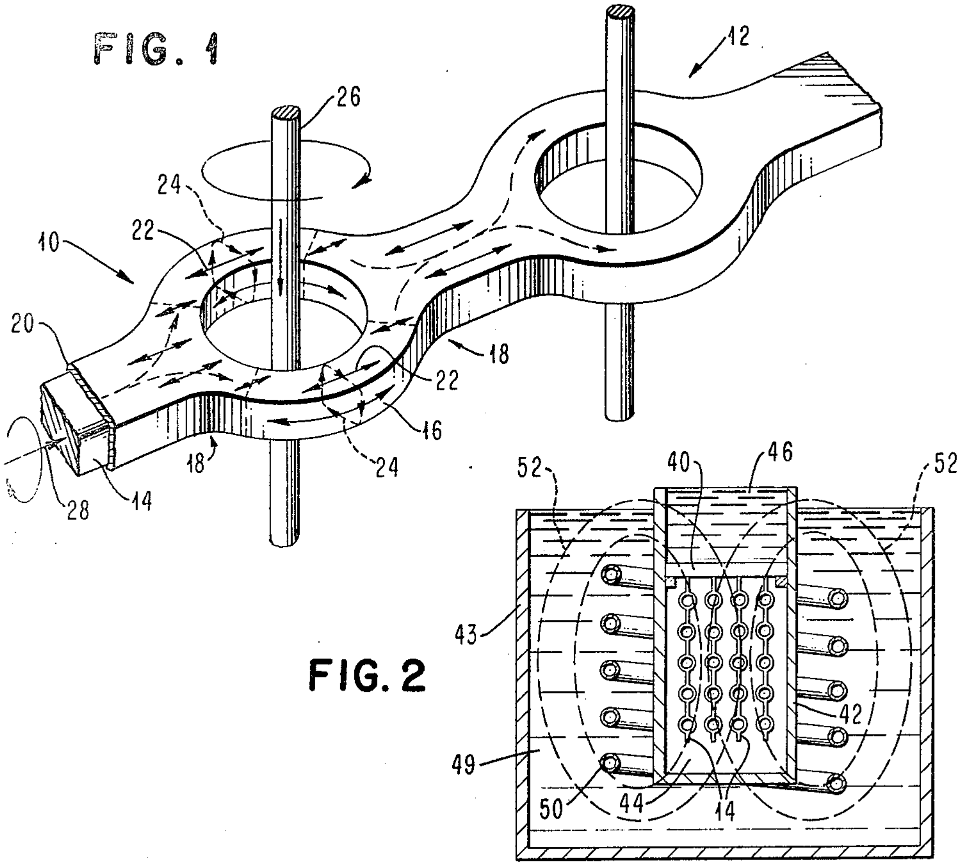
FIG. 1 is an isometric diagram of a chain storage element in accordance with this invention.
FIG. 2 is a cross-sectional view of an apparatus adapted to economically deposit an oriented magnetic film on an apertured conductor.

Referring now to FIG. 1, the chain storage element comprises a number of identical linked bit storage areas 10, 12, etc. An apertured conductive strip 14 is integral to the entire chain storage element and forms both a driving conductor for the element and a mechanical support for the magnetic portions of the element. Bit storage area 10 (as representative) includes a pair of bit storage legs 16 which are connected to each other by branching areas 18. Successive bit storage areas 10 and 12 are connected via neck area 20. The entire length of apertured conductor 14 is coated with an anisotropic thin magnetic film 20 which exhibits an easy direction of magnetization along the length dimension of the chain storage element as indicated by arrows 22 and an orthogonally oriented hard direction of magnetization as indicated by arrows 24. Passing through the aperture of bit storage area 10, is a bit-sense conductor 26 which enables data to be read out and written into each bit storage area. It should be recognized that while only two bit storage areas are illustrated in FIG. 1, that many such areas may form parts of one chain storage element.

In operation, a word current 28 is first applied to conductor 14. This current divides in branching area 18 and passes through bit storage legs 16 to recombine in succeeding branching area 18 and pass on to the next bit storage area 12. In so passing through bit storage legs 16, word current 28 causes the magnetic vector of thin film 20 to rotate and orient itself in hard direction 24. Depending upon which direction the magnetic vector lays before the application of word current 28, a pulse of one polarity or the other is induced into bit-sense conductor 26 by the aforementioned rotation of the magnetic orientation. This effect results in the bit of data previously stored in bit storage legs 16 being read out via bit-sense line 26. While word current 28 is still applied to apertured conductor 14, a bit current is applied to bit-sense conductor 26 to enable the storage of a new bit of data. If the bit current is as indicated in FIG. 1, the field generated thereby adds to the field generated by word current 28 and causes the magnetic vector in bit storage area 10 to rotate clockwise from the hard direction. When word current 28 is subsequently removed with the bit current still applied, the magnetic vector falls back to an easy direction of magnetization whose direction is directly influenced by the field generated by bit-sense conductor 26. In this case the final orientation in bit storage legs 16 is clockwise.

There is yet to be considered, the effect of branching areas 18 upon the aforementioned operation. It can be seen that the application of bit current to bit-sense conductor 26 tends to orient the magnetic vector in branching areas 18 in one of the two hard directions rather than the easy direction as in bit storage legs 16. This affect either opposes or aids the orienting field of word current 28 in branching areas 18. This of course is contra to the predictable and desired vector summation of the fields which occur in bit storage legs 16. Additionally, when word current 28 is removed, the bit current in bit-sense conductor 26 causes the magnetic vector of magnetic film 20 in branching areas 18 to remain oriented in the hard direction (directly opposite to its affect in bit storage legs 16). When the bit current is subsequently removed, the magnetic vector will fall back to one of the easy direction orientations and may or may not generate a flux which opposes the final orientation of the magnetic vectors in bit storage legs 16. This affect causes obvious problems when the data is read out.

When the idea of making magnetic film 20 anisotropic was first conceived, the easy and hard orientation directions had to be chosen. A theoretical analysis of a longitudinal easy orientation uncovered the above branching area problem and caused this configuration to be temporarily put aside. Next a circular easy direction of magnetization about each bit storage area was considered for alleviating the above-described branching area problems. The obvious method to produce such an orientation was to insert a conductor into the aperture of each bit storage area and achieve the desired orienting field by energizing the conductor either during the plating process or after the plating in a separate annealing treatment (known in the art as a "magnetic anneal"). This technique proved to be impractical for a number of reasons. The dimensions of each bit storage area in a chain storage element are extremely small, e.g., 20 mil outer diameter, 15 mil inner diameter with a thickness of approximately 2.5 mils. Additionally, each chain storage element is provided with 42 bit storage areas and economic batch processing requires that many chain storage elements be plated in one bath cycle. It was thus seen that a large number of extremely accurately aligned conductors would be required to produce the desired aligning fields. Also, in order to achieve a balanced and uniform plating throughout each bit storage area, none of the field producing wires could be allowed to touch the chain storage element. This was extremely difficult to assure, especially when an array with a large number of bit storage areas was considered.

Since the above-described orienting technique was found uneconomical, it was decided to try a longitudinal orienting field during the plating process (electroless). The mechanism used to perform the plating and orienting process is shown in FIG. 2. A plurality of apertured conductors 14 are mounted on rack 40 and placed in container 42 which houses the plating bath 44. Plating bath 44 is a chemical reduction solution which includes water soluble salts of nickel and iron, and hypophosphite and hydroxle ions. Bath 44 is covered with a layer of xylene 46 which prevents oxidation of the plating solution. Container 42 is housed within vat 48 which contains a liquid medium 49 for the purpose of maintaining a constant temperature about container 42. A coil 50 is positioned about container 42 and is electrically energized to produce flux lines 52 to provide the orienting fields. Thus, as the nickel-iron is electrolessly plated upon apertured conductors 14, the aligning field is simultaneously applied to produce the longitudinal anisotropic characteristics in the deposited film. This plating process is further and more fully described in the aforementioned copending application (d) of A. F. Schmeckenbecher.

Upon testing the chain storage element produced in accordance with the above apparatus, it was unexpectedly found that the expected damaging effects from the magnetic orientation in the branching areas did not materialize. While the physical action in these areas is not fully understood, one explanation having some basis in experimental evidence is that the amount of flux generated by the magnetic switching in bit storage legs 16 is sufficiently large to overcome any opposing flux switching in the branching areas 18. This effect is probably due to the greater amount of magnetic material in bit storage legs 16 versus the amount of the magnetic material in branching areas 18.

Figure 3A:
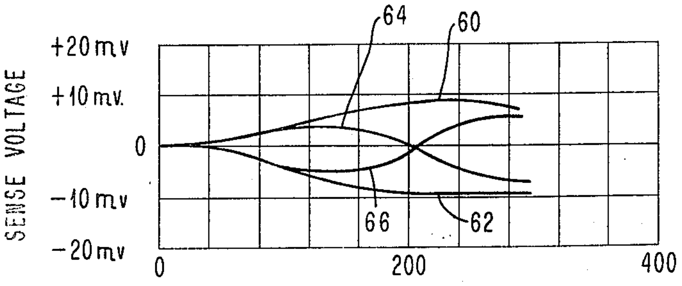
FIGS. 3A and 3B show graphical representations in the form of S curves which display comparative characteristics for isotropic and anisotropic chain storage elements.
Figure 3B:
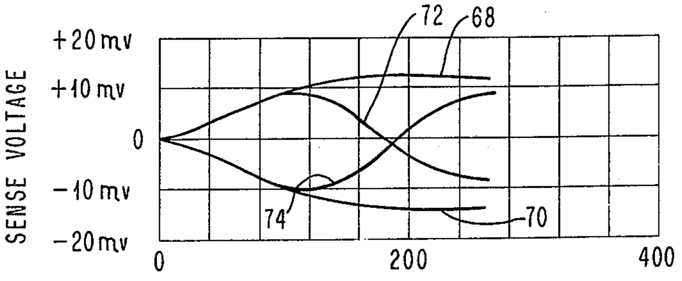

S curves were plotted for chain storage elements with unoriented (isotropic) magnetic coatings and for oriented (anisotropic) coatings. Two representative plots are shown in FIGS. 3A and 3B. Taking the S curves for the unoriented chain storage elements (FIG. 3A) as an example, the manner in which these curves are derived is as follows. Curve 60 is generated by repeatedly writing into a bit storage area and reading from it with a bit current which is gradually increased during successive cycles. The level of the word current is kept constant during this test. Curve 60 is then a plot of the sense voltage output versus bit current magnitude for any of a number of discrete bit currents. Curve 62 is derived in an identical manner except that an opposite polarity bit current is applied to bit-sense conductor 26 so that the opposite polarity sense potentials are induced. Both curves 60 and 62 are generated in the absence of any disturbing fields.

To detect and chart the effects which a disturbing field has upon the voltage output from a bit storage area, curves 64 and 66 are then generated. Curve 64 is derived by first applying a constant word current to the chain storage element. Then, a bit of information is written into bit storage 10 by applying a positive polarity bit pulse to bit-sense conductor 26. Next, a specified number of opposite polarity bit pulses are applied to bit-sense conductor 26 to disturb the magnetic orientation created by the initial write pulse. The disturbing bit pulses are of the same absolute magnitude as the initial positive polarity bit pulse. A word current is then applied to conductor 14 to read out the information stored in the bit storage area. This test is repetitively applied to the bit storage area with each repetition utilizing a slightly higher magnitude bit pulse and correspondingly higher, opposite polarity disturb pulses. As can be seen, up to a certain point curve 64 closely follows curve 60 but when the disturb pulses reach a certain magnitude, they begin to overcome the effect of the single bit pulse and cause destruction of the stored information and a resultant divergence of curve 64 from curve 60. Curve 66 is generated in an identical manner to curve 64 except that the applied write pulse is of an opposite polarity to that used for curve 64.

The S curves are useful in that they simultaneously show the maximum voltage sense output which a bit storage area is capable of producing and the maximum sense voltage output for a predetermined disturb situation. For the unoriented chain storage element it can be seen that the maximum expected sense voltage output is approximately $\pm 9$ millivolts (curves 60 and 62) while the maximum expected sense voltage output in a disturb environment (curves 64 and 66) is approximately $\pm 5$ millivolts. On the other hand, corresponding S curves 68, 70, 72 and 74 are shown for an oriented (anisotropic) chain storage element (FIG. 3B) which is oriented in a manner described with respect to FIG. 2. In this case, it can be seen that the maximum undisturbed voltage output is approximately $\pm 15$ millivolts whereas the maximum disturb output is approximately $\pm 10$ millivolts. From these curves, it should be obvious that the outputs from an oriented chain storage element are significantly enhanced over an unoriented chain storage element. This can be explained by the faster rotational switching which occurs in an anisotropic film versus the slower domain wall switching which occurs in an isotropic film. In other words, the more flux lines which are generated per unit of time, the higher the output potential induced into a sense conductor.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A chain storage element comprising:
an elongated conductor having at least two spaced enlarged areas provided with an aperture; and a thin anisotropic magnetic film deposited on said conductor at least around said aperture on the said enlarged areas, said film having an easy direction of magnetization, everywhere around said aperture, which is parallel to the length dimension of said conductor and a hard direction of magnetization which is aligned with the width dimension of said conductor.

2. A chain storage element comprising:
chain-like apertured conductive means; and
an anisotropic magnetic coating on said conductive means, said coating having an easy direction of magnetization, everywhere around apertures thereof, which is parallel to the length dimension of said conductive means and a hard direction of magnetization which is aligned with the width dimension of said conductive means.

3. A chain storage element comprising:
a chain-like apertured conductor; and
an anisotropic magnetic coating on said conductor, said coating having an easy direction of magnetization, everywhere around apertures thereof, which is parallel to the length dimension of said conductor and a hard direction of magnetization which is aligned with the width dimension of said conductor.

4. A chain storage element comprising:
a chain-like apertured conductor having a length dimension substantially greater than its width dimension; and
a thin anisotropic magnetic film on said conductor, said film having an easy direction of magnetization, everywhere around apertures thereof, which is parallel to the length dimension of said conductor and a hard direction of magnetization which is aligned with the width dimension of said conductor.

References Cited

UNITED STATES PATENTS

| | | | |
|---|---|---|---|
| 2,792,653 | 5/1957 | Rajchman | 340—174 |
| 3,371,327 | 2/1968 | Anderson et al. | 340—174 |
| 3,378,821 | 4/1968 | Leilich | 340—174 |

OTHER REFERENCES

Anderson, J. L., et al.: "Cross Core Memory Construction," IBM TDB, vol. 5, No. 7, December 1962.

STANLEY M. URYNOWICZ, Jr., Primary Examiner